Figure 1:
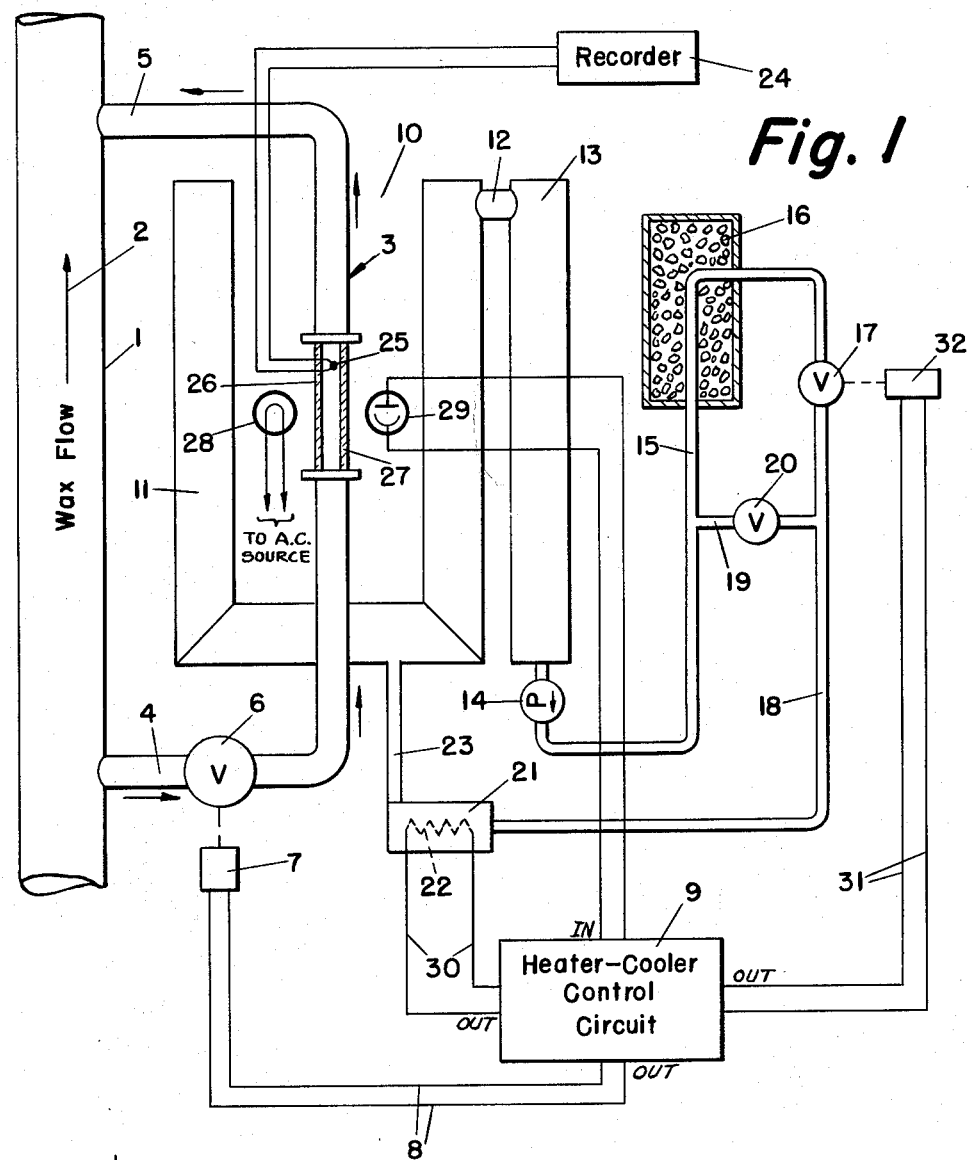

Aug. 11, 1964  C. W. WALLGREN  3,143,876
APPARATUS FOR DETERMINING MELTING POINT
Filed Jan. 11, 1961

INVENTOR.
CHARLES W. WALLGREN
BY Robert O. Spindle
ATTORNEY 3,143,876
APPARATUS FOR DETERMINING
MELTING POINT
Charles W. Wallgren, Ridley Park, Pa., assignor to Sun Oil Company, Philadelphia, Pa., a corporation of New Jersey
Filed Jan. 11, 1961, Ser. No. 82,013
1 Claim. (Cl. 73—17)

This invention relates to apparatus for determining the melting point of a fusible material, and more particularly to apparatus for determining, in a semi-continuous manner, the melting point of a stream of wax.

The specifications for commercial, petroleum-derived waxes customarily set forth a particular melting point for each wax product. This means that a determination of the melting point of each wax product must be made. Previously, this was done in batch-wise fashion, in a laboratory often quite distant from the wax manufacturing facilities, by suitable test or analysis of samples taken periodically from each wax product line. This batch-wise testing, in the laboratory, involves a considerable period of time, from the time when the sample is taken until the results of the melting point determination are ascertained and communicated to the operating personnel in the plant or manufacturing facility; this long time period very often results in wastage or loss of valuable product, since the melting point of the product must be known before suitable control or adjustment steps can be taken in the plant. In addition, the actual taking of the sample and its transportation to the laboratory can become laborious.

An object of this invention is to provide a novel apparatus for determining the melting point of a fusible material flowing as a liquid in a product line.

Another object is to provide an apparatus for determining the melting point of a stream of wax flowing in a line, the determination being carried out in a semi-continuous manner.

A further object is to provide a melting point determining apparatus which is capable of operating in the plant itself, immediately adjacent the plant product stream, rather than in a laboratory which is necessarily some distance away from the plant.

The objects of this invention are accomplished, briefly, in the following manner: a branch line is coupled in by-pass fashion to a main line in which there is flowing, in a liquid state, the fusible material (e.g., wax) whose melting point is to be determined. The branch line thus abstracts a sample from the main line, and (due to its bypass configuration) thereafter returns the sample to the main line. Means are provided for selectively cooling or heating a portion of this branch line, and the cooling and heating means are controlled automatically in such a manner that they are alternately rendered effective, thereby alternately solidifying and liquefying the wax in the said branch line portion. A thermocouple, which is connected to a temperature recorder, is inserted into the said branch line portion so as to continuously indicate the temperature of the wax therein. The melting point of the wax is determined from the temperature curve drawn by the temperature recorder as the wax cools or solidifies.

Figure 2:
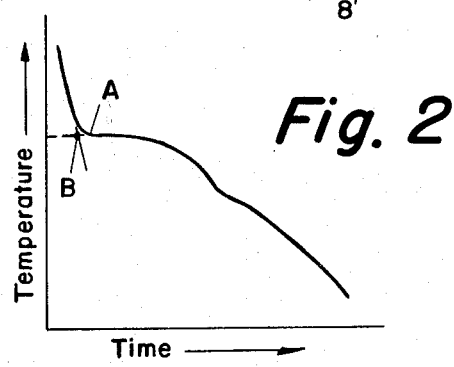

A detailed description of the invention follows, taken in conjunction with the accompanying drawings, wherein:

FIG. 1 is a diagrammatic view illustrating an apparatus according to the invention; and FIG. 2 is a curve useful in explaining the invention.

First refer to FIG. 1. The pipe line 1 is a main product line through which wax (or other fusible material whose melting point is to be determined) is flowing, in a liquid state, in the direction indicated by arrow 2. The main line 1 is ordinarily heated, in the usual manner, to maintain the wax in a liquid state. A branch line 3, which is substantially U-shaped in configuration, has its legs 4 and 5 coupled to line 1 at respective spaced points along the length of this line, leg 4 being located at a point upstream from leg 5. Therefore, if at any particular time line 3 is open throughout its length and if the wax therein is liquid, branch line 3 serves as a bypass for a portion of the length of line 1. That is to say, at such time branch line 3 abstracts a wax sample from the main line 1, this sample flowing first through the upstream leg 4, next through the body of branch line 3, and then returning to line 1 by way of the downstream leg 5.

A solenoid-operated valve 6 is provided in the upstream leg 4 of branch line 3. Valve 6 is mechanically operated by means of a solenoid 7, which is adapted to be controlled by way of a pair of leads 8 from a heater-cooler control circuit 9, to be described hereinafter in more detail. The solenoid 7 functions to selectively open or close the valve 6.

The body of branch line 3 is located in an opening 10 in a bath structure 11 through which a liquid is circulated so as to have heat exchange relationship with the wax sample in branch line 3. The outlet 12 from the bath is desirably connected to the upper end of a standpipe 13 at the lower end of which there is connected the recirculating pump 14 arranged to deliver the bath liquid at 15 through a cooling region indicated at 16 which may be in the form of a container of ice. Alternatively, this cooling may be provided by mechanical refrigeration. From region 16, the liquid passes through a valve 17, which is automatically controlled as will be hereinafter described, and thence to a pipe 18. The cooling region 16 is arranged to be bypassed by a connection 19 containing a manually adjustable valve 20. The pipe 18 communicates with a heating chamber 21 in which there is located a heater resistance 22. From the chamber 21, the liquid passes through a pipe 23 to the inlet of the bath 11. By on-off control of current through the heater resistance 22 and by appropriate automatic control of the valve 17, the valve 20 being in a partially throttling codition with respect to liquid flowing through the bypass 19, it will be evident that the liquid in the bath 11 may be either cooled or heated, so that this bath has either a cooling or heating effect on the wax sample in branch line 3. In accordance with the invention, this control is so carried out that the bath liquid (and thereby also the branch line 3) is alternately and respectively cooled and heated, thereby to cause alternate solidification and liquefaction of the wax sample in the branch line.

As an alternative to the arrangement shown, both a heating element and a cooling coil could be provided in a chamber similar to 21, the bath liquid circulating only through such chamber. In this case, the heating element and cooling coil would be suitably controlled to provide the desired alternate (and repetitive) cooling and heating action.

A temperature recorder 24 operated by a thermocouple is of conventional type and records the temperature of the wax sample in branch line 3, the recorder input being from a thermocouple 25 immersed in the wax sample near the midpoint of line 3.

According to this invention, a photoelectric type of control is used to cycle the temperature of the bath liquid, and also to control the valve 6. In a mid-region of the branch line 3 there are provided two aligned glass ports 26 and 27 which permit a light beam to be transmitted in a transverse (horizontal) direction through the wax sample in line 3. Alternatively, a section of glass tubing or pipe could be used here, or any other appropriate port material which is transparent could be used, instead of glass. A suitable source of light (as illustrated, this may be an incandescent lamp 28 energized from an alternating current source) is arranged to project a beam of light transversely of line 3, through port 26, through the wax in this branch line (when such wax has transparent or light-transmitting properties), and through port 27, to a photocell 29 which is positioned adjacent port 27, on the opposite side of line 3 from the lamp 28. Obviously, for proper operation, photocell 29 will have to be shielded from ambient light, so that it will respond only to light or absence of light from lamp 28.

Photocell 29 is connected to the input of the heater-cooler control circuit 9. Circuit 9 may comprise merely an amplifier operating to amplify the signal from photocell 9, and a relay operated by the amplifier output. The relay in circuit 9 is adapted to connect a source of energy to several different output circuits, in a selective manner. One output, previously mentioned, is coupled to the pair of leads 8 which extend to solenoid 7. Another output is coupled to a pair of leads 30 which extend to heater resistance 22. Still another output is coupled to a pair of leads 31 which extend to a solenoid 32 which mechanically operates valve 17. The solenoid 32 functions to selectively open or close the valve 17.

The manner of operation of the control circuit 9 will now be described, so that its arrangement and connections will become apparent. When photocell 29 receives substantial light from lamp 28, circuit 9 controls solenoid 32 (by way of leads 31) so as to open valve 17, thereby to supply cold liquid to bath 11 (it is pointed out that pump 14 operates continuously). At this same time, circuit 9 cuts off or deenergizes heater 22, and solenoid 7 is controlled to close valve 6.

When light is substantially completely cut off from photocell 29, circuit 9 controls solenoid 32 so as to close valve 17, thereby to cut off the cold liquid supplied to bath 11 (in this case, the entire bath liquid supply flows through bypass 19). At this time, circuit 9 energizes heater 22 (by way of leads 30), so that the bath liquid is heated in chamber 21 prior to its reaching the bath 11. At this time, also, circuit 9 controls solenoid 7 (by way of leads 8) so as to open valve 6.

In view of the above-described operation of control circuit 9, it will be realized that the control circuit 9 may be of relatively simple and inexpensive design, and may in fact comprise the amplifier-relay combination previously described.

The operation of the melting point determining apparatus of this invention will now be described. It may be assumed that, initially, valve 6 is open, and the wax in branch line 3 is in a liquid state. In this case, wax flows through branch line 3, as well as through main line 1. The direction of the flow through branch line 3 is in the direction of the associated arrows. Thus, branch line 3 abstracts a sample from main line 1 under these conditions.

When the wax in branch line 3 is liquid, it is transparent, so that light from lamp 28 passes through the sample and impinges on photocell 29. Circuit 9 then opens valve 17, thereby to supply cold liquid to bath 11; heater 22 is then deenergized and valve 6 is then closed, the latter by the action of solenoid 7. The closing of valve 6 (when the cooling valve 17 is opened) cuts off the flow of additional hot wax from main line 1 into branch line 3, and thus reduces the time required to solidify the wax sample in the branch line.

The supply of cold liquid (from cooling zone 16) to bath 11 cools the wax sample, in that portion of branch line 3 which is within the bath structure 11. It will be appreciated that, when the wax sample in branch line 3 solidifies, the flow through such branch line is blocked by the solidified wax acting as a valve; valve 6 could then be opened if desired, without any adverse effect. When the wax sample solidifies, it becomes relatively opaque, so that the light from lamp 28 is substantially completely cut off from photocell 29. When this occurs, circuit 9 functions to close valve 17, thereby to cut off the cold liquid supplied to bath 11. At the same time, heater 22 is energized, and valve 6 is opened.

The supply of heated liquid (from heating chamber 21) to bath 11 heats the wax sample, in that portion of branch line 3 which is within the bath structure 11. Valve 6 being open, as soon as the wax in branch line 3 becomes liquid enough to flow, such flow does take place through branch line 3, resulting in a new sample being abstracted from main line 1. When the wax sample melts or becomes liquid, it again becomes transparent. When light from lamp 28 again passes through the sample and impinges on photocell 29, circuit 9 operates to deenergize heater 22 (thereby to cut off heat from the sample), to close valve 6, and to open valve 17 (thereby to start a cooling cycle once again, but this time with a new sample in the branch line).

From the foregoing, it may be seen that the apparatus of this invention functions by alternately and repetitively cooling and heating that portion of branch line 3 which is within bath structure 11, thereby to cause alternate solidification and liquefaction of the wax sample in this branch line portion. To state this another way, alternate and repetitive cooling and heating cycles are employed for the wax sample. By way of example, a complete cycle of operation (that is, a cooling cycle plus a heating cycle) may require about fifteen minutes. Thus, it may be seen that about every fifteen minutes, a new determination of melting point is automatically made by the apparatus of this invention, using a new sample each time. Therefore, the determination of the melting point of the wax stream in line 1 is made in a semi-continuous manner.

The thermocouple 25 is immersed in the wax sample in branch line 3, and therefore responds continuously to the temperature of the sample. The recorder 24, to whose input thermocouple 25 is connected, thus serves as a means for indicating the temperature of the material in branch line 3. The recorder indicates the temperature of the wax sample during both the cooling the heating cycles. The temperature-vs.-time curve produced by the recorder during the cooling cycle is known as a cooling curve, while the temperature-vs.-time curve produced during the heating cycle is known as a heating curve. Heating curves are generally unsatisfactory for the determination of melting point. However, cooling curves are readily and easily usable for the determination of melting point.

FIG. 2 is a typical wax cooling curve, such as might be produced on the chart of recorder 24 during a cooling cycle, that is, when valve 17 is open, when valve 6 is closed, and when heater 22 is deenergized. In the cooling curve of FIG. 2, at first the temperature of the sample decreases quite rapidly with time, until in the vicinity of region A the time rate of decrease of temperature falls off very abruptly to almost zero, to give an inflection point on the cooling curve. The actual melting point is located at B, which is the intersection of the two asymptotes one of which is asymptotic to the steeply sloping portion of the cooling curve, just to the left of region A, and the other of which is asymptotic to the almost horizontal portion of the cooling curve, just to the right of region A. The temperature corresponding to point B can be scaled off on the vertical or temperature axis, and this temperature can be taken as the actual melting point of the particular wax product being sampled or analyzed by the apparatus of the invention.

If the electrical conductivity of solid wax is measurably different from that of liquid wax, the FIG. 1 apparatus could be modified to use electrical probes which would measure the electrical conductivity of the wax sample, as a liquid or a solid. These probes could be used in place of the thermocouple 25. In this modification, the cooling and heating cycle previously described would again be used.

If the approximate melting point of the wax being analyzed is known in advance, it is possible to use other types of control to establish the cooling and heating cycles, (instead of the photoelectric control described previously). A simple thermal regulator, set at two predetermined temperatures (one somewhat above the melting point of the wax and the other somewhat below such melting point), could be used to control the cooling and heating cycles. In this case, the same thermocouple could perhaps be used for the input to the thermal regulator, and also for the input to the temperature recorder. The control would then be arranged so that valve 17 would be opened and heater 22 deenergized at the higher of the two predetermined temperatures, while valve 17 would be closed and heater 22 energized at the lower of the two predetermined temperatures. This would result in the desired cooling and heating cycles for the wax sample, and the melting point could be determined from the temperature recorder, as previously described.

In this last-mentioned modification, the valve 6 would be controlled in a manner similar to that previously described. That is to say, valve 6 would be opened when heater 22 is energized, and would be closed when valve 17 is opened.

The invention claimed is:

Apparatus for determining the melting point of a fusible material flowing in a liquid state in a main line, comprising a branch line for abstracting a sample from said main line, a controllable valve in said branch line, controllable means for cooling at least a portion of said branch line, controllable means for heating said portion of said branch line, means for operating said valve to the closed position and simultaneously rendering effective said cooling means, thereby to close off said branch line from said main line and to thereafter cause solidification of the material in said branch line portion, said operating means acting automatically in response to the presence of liquid sample in said branch line; said operating means also acting automatically, in response to the solidification of said last-mentioned material, to operate said valve to the open position and simultaneously render effective said heating means, thereby to open said branch line to said main line and to thereafter cause liquefaction of said last-mentioned material; and means for indicating the temperature of said last-mentioned material.

References Cited in the file of this patent
UNITED STATES PATENTS

| | | |
|---|---|---|
| 2,591,084 | Martin | Apr. 1, 1952 |
| 2,669,863 | Shapiro | Feb. 23, 1954 |
| 2,885,885 | Lupfer et al. | May 12, 1959 |
| 2,997,874 | Billuris et al. | Aug. 29, 1961 |
| 3,031,880 | Findlay | May 1, 1962 |